Sept. 24, 1968  O. HABERKORN  3,402,885
MULTIPLICATION ARRANGEMENT IN CALCULATING MACHINES
Filed July 26, 1966  5 Sheets-Sheet 1

INVENTOR:
Otto Haberkorn

Sept. 24, 1968  O. HABERKORN  3,402,885
MULTIPLICATION ARRANGEMENT IN CALCULATING MACHINES
Filed July 26, 1966  5 Sheets-Sheet 4

INVENTOR:
Otto Haberkorn

Sept. 24, 1968   O. HABERKORN   3,402,885
MULTIPLICATION ARRANGEMENT IN CALCULATING MACHINES
Filed July 26, 1966   5 Sheets-Sheet 5

INVENTOR:
Otto Haberkorn

United States Patent Office 3,402,885
Patented Sept. 24, 1968

3,402,885
MULTIPLICATION ARRANGEMENT IN
CALCULATING MACHINES
Otto Haberkorn, Gerstetten, Wurttemberg, Germany, assignor to Walther-Boromaschinen G.m.b.H., Gerstetten, Wurttemberg, Germany, a limited-liability company of Germany
Filed July 26, 1966, Ser. No. 567,985
7 Claims. (Cl. 235—60)

The present invention relates to the structure in calculating machines for carrying out multiplication operations, more particularly, to such an arrangement for the rapid continuous addition or subtraction of the multiplicand and a corresponding series of successive revolutions of the machine drive mechanism for each decimal place of the multiplier.

The conventional arrangement in existing calculating machines for multiplication operations essentially comprises individual multiplier elements for the decimal places and numerical values of the multiplier. Further, there are selectors having descending steps for the numerals 1–5 and ascending for the numerals 6–9. The vertical distances between adjacent ascending or descending steps are generally equal and each corresponds to one machine operation. The selector mechanism generally comprises a number of slidably mounted parallel selector levers which transfer selected numerical values successively by lateral translation. Such lateral translation, however, requires considerable space which is generally not available in the compact design and construction of present day calculating machines. Thus, it becomes difficult to incorporate such a lateral translation arrangement in the limited space of calculating machines. In addition, the individual parallel selector elements are extremely thin and are spaced so close to each other that the lateral distance available for the transfer elements becomes insufficient.

It is therefore the principal object of the present invention to provide a novel and improved multiplication arrangement for calculating machines.

It is another object of the present invention to provide a calculating machine having a multiplication mechanism and a multiplication unit therein which are constructed independently of each other but which may be operatively connected for multiplication operations.

In one aspect of the present invention the calculating machine comprises a housing having a ten-key key board thereon and a set pin carriage laterally movable within the housing upon the depression of a key. Within the housing there is provided a multiplication mechanism and a separate multiplication unit. The mechanism includes a plurality of coaxially arranged gears with each gear having twenty peripheral teeth, two zero stops and a clearing cam. Also carried by the mechanism is a rotatable and axially movable hinge lever which may be coupled with the set pin carriage and only one gear at a time. The gears are locked in position by a slidably mounted stabilizing bar which has cam surfaces at both ends thereof so that axial movement of the bar will also move the bar laterally into or out of engagement with the gears. The gears are all rotated together by the bar in the zero direction. In order to calculate the decimal places the sliding lever controlled by the set pin carriage retains the corresponding ear in the zero position by means of the zero cam on that gear. The values on the gears are transferred to a separate multiplication unit which for this purpose is coupled to the multiplication mechanism by means of the stabilizing bar.

The multiplication unit is rotatably mounted on a fixed bushing and may consist of three disks rigidly mounted on a common sleeve. One disk comprises a cam plate having a number of cam surfaces thereon for positive and negative control of the unit. Another disk comprises a locking gear having twenty geared teeth and may be locked in position by a locking lever. The third member is a disk having ten peripheral notches with two diametrically opposed notches being deeper than the others and representing the multiplier value for 0 or 10 respectively with the others representing the remaining even and odd numerals (2, 4, 6, 8 and 1, 3, 5, 7, 9).

Other objects and advantages of the present invention will be apparent upon reference to the accompanying description when taken in conjunction with the following drawings wherein.

Proceeding next to the drawings wherein like reference symbols will indicate the same parts throughout the various views of a specific embodiment of the present invention will be described in detail.

Figure 1:
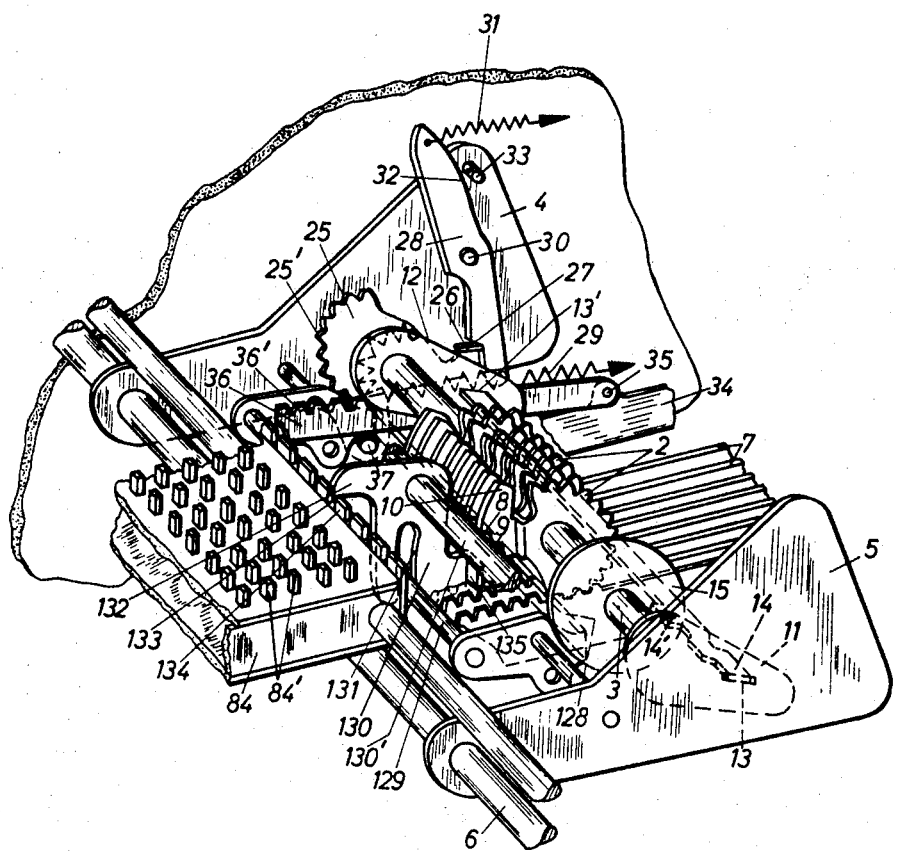
FIGURE 1 is a perspective view of a portion of the mechanism within the calculator showing the multiplication mechanism of the present invention with the set pin carriage being in its normal position of rest.

In FIGURE 1 there is illustrated the multiplication mechanism of the present invention which comprises a plurality of multiplication gears 2 mounted on a common shaft 3 extending between arms 4 and 5 which are pivotally mounted on a shaft 6 extending across the housing of the machine. Thus, the gears, arms and shaft 3 form a single component which rotates about shaft 6 and meshes the gears 2 with the teeth on the differential members 7 in a known manner in order to transfer the value of the multiplier.

Figure 3:
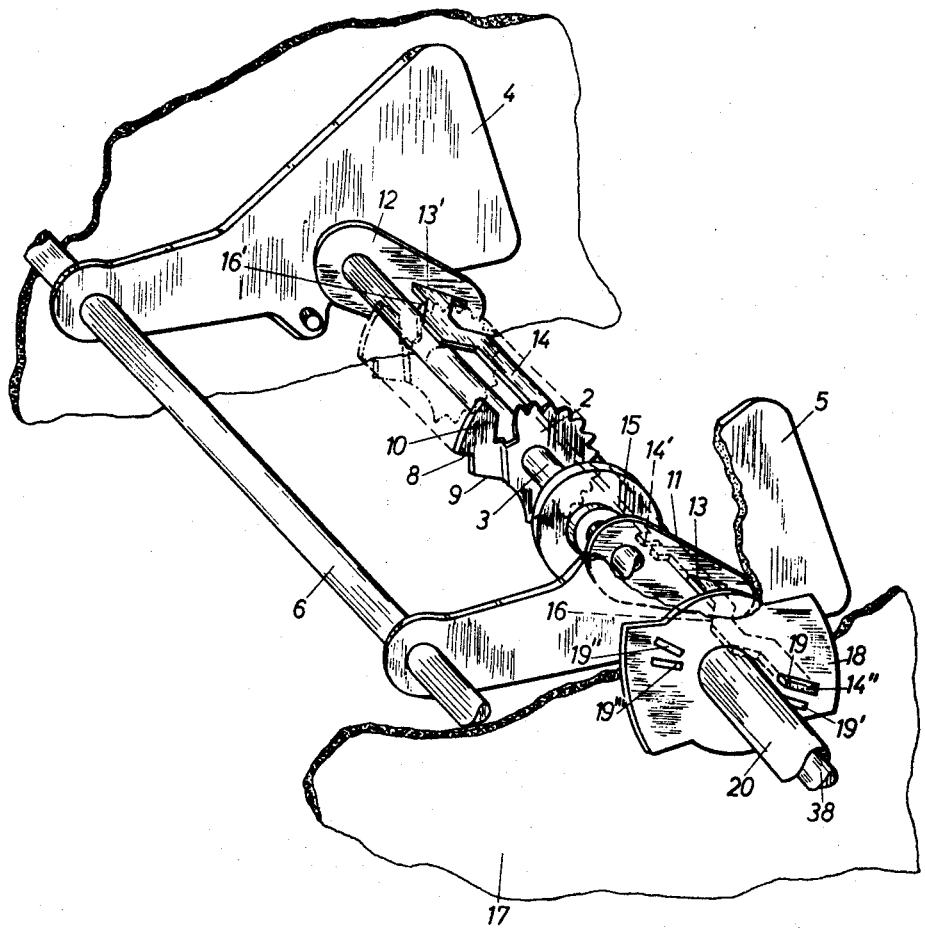
FIGURE 3 is a perspective view similar to that of FIGURE 1 and showing the stabilizing bar operatively connected to the multiplication unit.

The gears 2 are each provided with twenty teeth extending over one half of their circumference and with zero stops 8 and 9 and a clearing cam 10 on the other half of their circumference. On both ends of the shaft 3 there are mounted guide arms 11 and 12 which have slots 13 and 13' therein respectively for slidably supporting a stabilizing bar 14. The bar 14 has a guide slot 14' which is engaged by a control disk 15 also mounted on shaft 3 and axially movable thereon. At the ends of the bar 14 there are cam surfaces 16 and 16' which disengage the bar 14 from gears 2 when the bar is moved toward the left as viewed in FIGURE 3.

When the bar 14 is moved to the right the bar is engaged with the gears 2 locked in position.

The right end of the bar 14 indicated at 14" extends through a side wall 17 of the machine for intermediate coupling with the multiplication unit cam plate 18 provided with radially extending slots 19, 19', 19", and 19'''. The cam plate 18 is fixedly mounted on a sleeve 20 together with a control disk 21 and a locking gear 22 as may be seen in Figures 2 and 5. The components 18, 20, 21, and 22 form the multiplication unit indicated at 23 which is rotatably mounted on a fixed bushing 24 extending from side wall 17.

As may be seen in FIGURE 1, a clearing gear 25 is mounted on the left end of shaft 3 and has a lug 26 thereon which is engageable with a notch 27 on a locking lever 28 with the lug and notch being urged into engagement under the action of the spring 29 one end of which is attached to the gear 25.

Locking lever 28 is pivoted on pin 30 which is attached to arm 4 and has a spring 31 attached to its upper end to urge a surface 32 against a stop pin 33 also mounted on the arm 4.

Beneath clearing gear 25 there is a link 34 which is connected at 35 to a rack 36 having teeth 36' which are in mesh with teeth 25' on the clearing gear 25. The rack 36 is slidably supported on pin 37 which is attached to the arm 4.

The structure by which the multiplication unit 23 is connected to other mechanism of the machine is a shaft 38 which extends outwardly from the bushing 24 and upon which is pivotally mounted a control member 39 having two axially extending pins 40 and 41 thereon. The control member 39 has an additional pin 42 upon which is pivotally mounted a jack lever 43 (FIGURE 2) which has a flange 44 engageable with the control disk 21. The jack lever 43 has a pin 45 extending therefrom which is slidably engaged in a curved slot 46 formed in a lever 47 which is pivotally mounted on the fixed shaft 48. The lever 47 has a downwardly directed arm 49 upon which is mounted a pin 50 which is connected to a link 51. The link 51 has a slot 52 at the other end thereof in which is received a pin 53 mounted on the lower portion of lever 54. The lever 54 has a pin 55 upon which is connected one arm of a crank lever 56 pivotally mounted on a fixed shaft 57. Extending from the lever 56 and surrounding the shaft 57 is a sleeve 58 at the other end of which is an arm 59.

Figure 4:
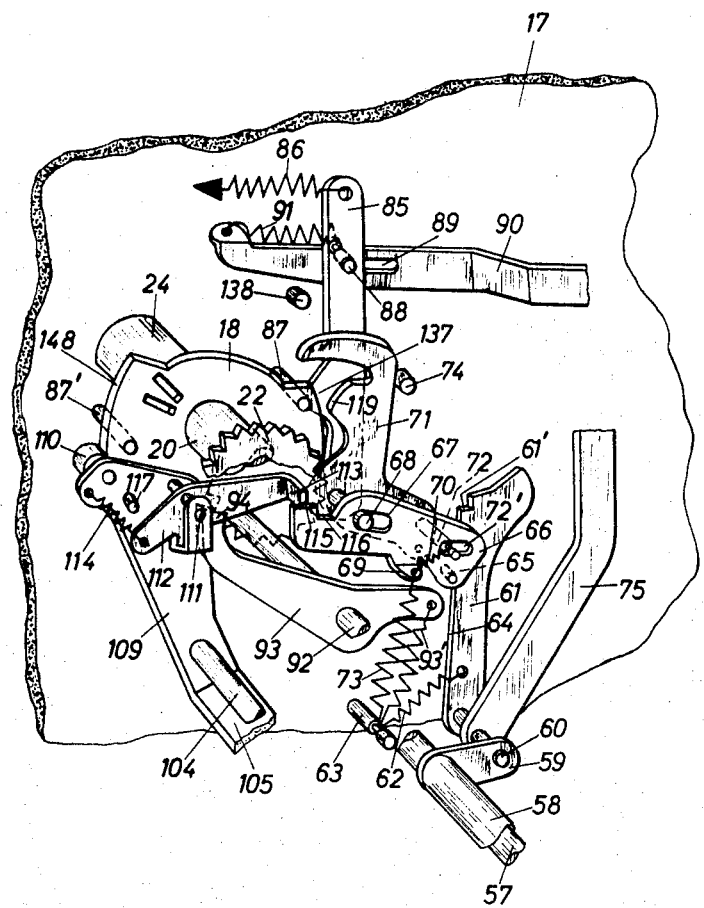
FIGURE 4 is a perspective view similar to that of FIGURE 2 and showing the components engageable with the cam plate of the multiplication unit.

Extending from the arm 59 is a pin 60 upon which is pivotally mounted a lever 61 which is urged to the left as seen in FIGURE 4 by a spring 62 whose other end is attached to a fixed pin 63. The inner edge of the lever 61 indicated at 64 is engageable with a pin 65 mounted on slide 66 which has a slot 67 therein into which is inserted a fixed pin 68. The slide 66 has a spring flange 69 to which a tension spring 70 is connected with the other end of spring 70 being connected to a curved crank arm 71 by means of a pin 72. Pin 72 is received in another spot 72' on the slide 66. With this construction the curved lever 71 is also mounted on and can rotate on pin 68 and by means of a tension spring 73 is urged into engagement with stop pin 74 mounted on the side wall 17.

Figure 2:
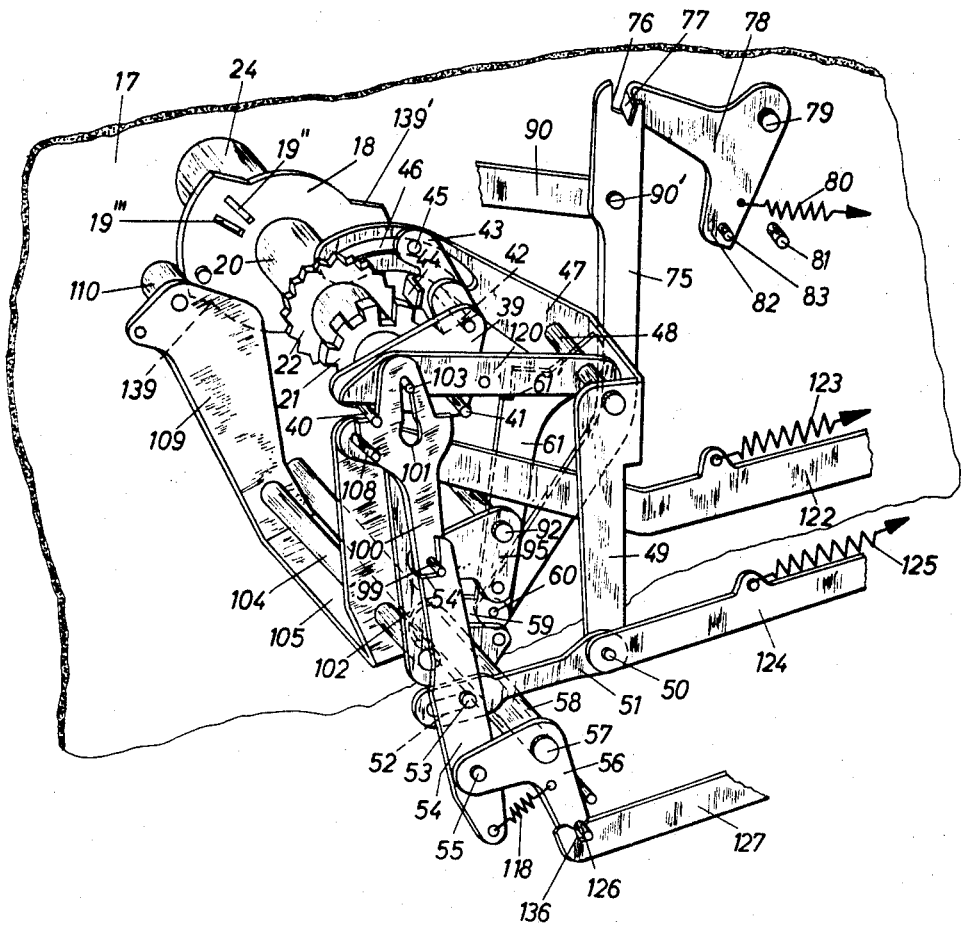
FIGURE 2 is a perspective view of the multiplication unit of the present invention and the various operative connections thereto.

Also mounted on the pin 60 of the lever arm 59 as shown in FIGURE 2 is a lifting bar 75 which extends upwardly and has a notch 76 in its upper end engageable by a lug 77 on a lever 78 pivotally mounted on a fixed pin 79. A spring 80 is attached to the lower portion of the lever 78 and urges the lever against stop pin 81. When the lifting bar 75 is lowered, the lever 78 is released and engages the pin 81 under the action of spring 80. At the same time, a pin 83 which is mounted on the lower portion 82 of the lever 78 is operatively connected to linkage which is not disclosed herein which linkage is operatively connected to the set pin carriage 84 shown in FIGURE 1.

Mounted between the arms 4 and 5 of the multiplication unit is a shaft 130' upon which is pivotally mounted an angle lever 130 which is also capable of axial movement on the shaft. A U-shaped contact bar 128 is pivotally mounted between the arms 4 and 5 and has a shaft 129 which cooperates with a curved slot 131 extending upwardly from the lower edge of the angle lever 130. The slot 131 enables the angle lever 130 to pivot in a counter clockwise direction to the point where its nose 132 drops into a recess 133 upon the set pin carriage 84 which also has a cam 134 in order to achieve an operative connection between the set pin carriage, the lever 130, and the gears 2. Concurrently with the engagement of nose 132 in recess 133, a flange 135 on the other end of angle lever 130 is engaged with a zero stop 8 or 9 of a corresponding gear.

A shift lever 85 is pivotally mounted on fixed pin 68 as may be seen in FIGURE 4 and is engageable with pin 87 which extends axially from the cam plate 18 and is urged into engagement with this pin under the action of a spring 86. There is a similar pin 87' on plate 18 and positioned diametrically from pin 87. Pin 87' is also engageable with shift lever 85 when the cam plate 18 is rotated to another position.

The shift lever 85 also has a pin 88 thereon which engages a slot 89 on a link 90 which is connected by pin 90' to the lifting bar 75 as shown in FIGURE 2 and is continuously urged toward the right by spring 91.

On a shaft 92 which is fixedly mounted to the machine side wall 17 there is pivotally mounted a notch lever 93 which has a notch end 94. The notch 94 is urged into engagement with locking gear 22 under the action of a spring 93'. The shaft 92 also has pivotally mounted thereon a lever 95, shown in FIGURE 2, which has a bearing surface 96 urged into engagement with a fixed pin 98 under the action of spring 97.

At the left end of lever 95 there is mounted a pin 99 upon which is pivotally mounted a latching lever 100 having notches at its upper end engageable with pins 40 and 41 on the control lever 39. The latching lever has a slot 101 which receives a pin 103 mounted on a lever 102 which is pivotally mounted on a fixed shaft 104 mounted on the machine side wall 17. In addition, there is a U-shaped control arm 105 pivotally mounted on shaft 104 with a spring 106 interconnecting the right arm 107 with the lower portion of lever 102. This also brings a pin 108 fixed on the upper portion of arm 107 into engagement against the latching lever 100. The left arm 109 of the control arm has a cam follower roll 110 thereon which is engageable with the peripheral cam surfaces of cam plate 18. Left arm 109 also has a pin 111 mounted thereon upon which is pivotally mounted a lever 112 having a bent lug 113 on one end and having its other end connected by spring 114 to a portion of left arm 109. The spring 114 urges the bent lug 113 into engagement with a portion 115 on the slide lever 66. The bent lug 113 may also be lowered to engage a notch 116 also mounted on slide lever 66 with the pivoting movement of lever 112 being limited by the stop pin 117 on the left arm 109.

As may be seen in FIGURE 2 there is provided on the lower portion of the lever 54 a spring 118 which is connected to the crank lever 56 in order to maintain the notch 54' on lever 54 in engagement with stop pin 99 on lever 95. The pins 87 and 87' on the cam plate 18 are also engageable with a cam surface 119 on the curved lever 71 as may be seen in FIGURES 4 and 5.

The fixed shaft 48 has also pivotally mounted thereon an adjuster lever 120 which under the action of spring 121 bears against pins 40 and 41 on control plate 39 so as to maintain the control plate in a position of rest.

There is further provided a link 122 which is pivotally connected to the pin 108 on the control arm 105 and urges the control arm to the right under the action of spring 123 to maintain the roll 110 in engagement with cam plate 18. While not shown herein, the link 122 is operatively connected to the negative or minus mechanism of the calculating machine in a known manner.

An additional link 124 is provided which is pivotally connected to pin 50 on the lower portion of lever 49 and is maintained in operative engagement with a cam surface under the action of spring 125 in a known manner. Further, a link 127 has a notch 136 which is engageable with pin 126 on the lever 56 with the link 127 also being in operative engagement with a cam surface not shown here but well known in the art.

*Operation of the multiplication arrangement*

The structure as described above is incorporated into a conventional well known calculating machine having a ten-key key board where in the values punched on the keys are transmitted to the set pin carriage by the set pins 84' carried thereon. Each depression of a key also causes the set pin carriage to move laterally. The pressed pins 84' then transmit the values to the differential members 7 in a well known manner and the total of these values is then transferred into the calculating mechanism. By the use of the function keys conventionally found on the key board of such a calculating machine the value is transmitted through the differential members to the multiplication gears 2 of the multiplication mechanism. The values are stored in the gears 2. Through further actuation of a suitable function key the multiplication operation itself is commenced. To facilitate the comprehension of the present invention the operation of this invention will be described in connection with the multiplication of the example 704×1825.

Initially, the multiplier 704 is set in the set pin carriage 84 by depressing the suitable keys on the key board. The multiplier key on the key board is then depressed to initiate the first step in multiplication and transfers the value 704 to differential members 7. This actuation of the multiplier key actuates the control gear 15 to shift the stabilizing bar 14 to the left to unlock the gears 2 in position. At the same time, the locking lever 28 is pivoted counter clockwise to release the clearing gear 25 which under the action of spring 29 rotates in a counter clockwise direction to depress all of the gears 2 until zero stops thereon engage the bar 128. The unlocked gears 2 are brought into contact with the differential member teeth and the value is transferred to the multiplication mechanism. The stabilizing bar 14 is then returned to the right to its initial position under the action of the clearing wheel 25 actuated by the rack 36. Shifting of the bar 14 to the right again locks the gears 2.

Figure 5:
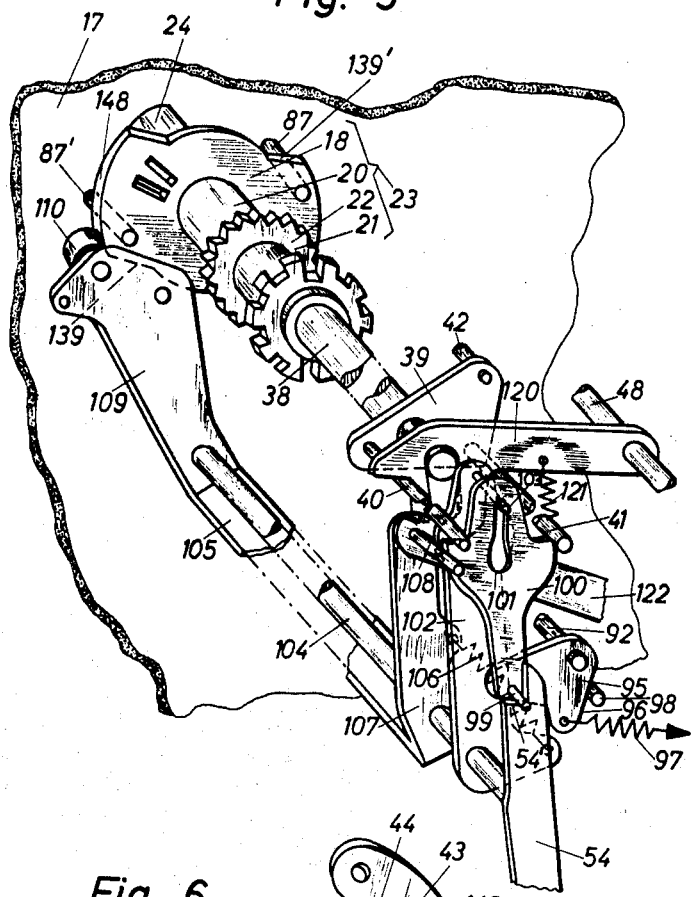
FIGURE 5 is a perspective view similar to that of FIGURE 4 and showing additional components further spaced from the multiplication unit.

In the next operation the multiplicand 1825 is introduced into the set pin carriage 84 by depressing the proper keys of the key board in the conventional manner. Then, the multiplicand key on the key board is depressed to initiate the second step in the multiplication operation. At this time the stabilizing bar 14 is shifted still further to the right under the action of the control gear 15 until the end 14" of the bar engages one of the slots 19 so as to become operatively connected to the multiplication unit 23. The contact bar 128 is lowered and the angle lever 130 is rotated counter clockwise until its nose 132 drops into a recess 133 on the set pin carriage opposite a corresponding gear 2. The angle lever 130 thus connects the multiplication mechanism and the set pin carriage. At the same time, the flange 135 on the other end of the angle lever 130 engages the zero stops 8 of the gears 2 to prevent their rotation. The clearing gear 25 is then released from locking engagement with locking lever 28. Under the action of spring 29 clearing gear 25 rotates to depress the gears 2 in the direction of the zero position until flange 135 of hinge lever 130 engages the zero stops 8. The multiplication unit 23 as seen in FIGURE 5 is also rotated by the stabilizing bar 14 through, for example, a distance of four notched units. The control gear 15 then shifts the stabilizing bar 14 a sufficient distance to the left until the bar becomes disengaged from multiplication unit 23. The cam surfaces 16 and 16' are now not in operation and the bar remains locked in gears 2.

Figure 6:
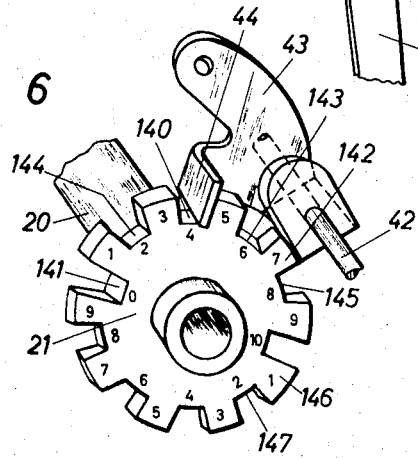
FIGURE 6 is a perspective view in enlarged scale showing the control disk of the multiplication unit in an operating position.

The rotation of multiplication unit 23 is stopped by the engagement of lug 94 on lever 93 with locking gear 22. As shown in FIGURE 6 recess 140 of control disk 41 is positioned opposite flange 44 of lever 43. Under the action of link 124 and its attached spring 125 which are actuated by the cam surfaces of the machine mechanism, arms 49 and 47 are rotated counter clockwise until pin 45 under the action of groove 46 in arm 47 urges lever 43 downwardly until flange 44 engages notch 140. In addition, another lifting cam which is part of the drive mechanism of the machine and not disclosed here moves link 127 to the left to rotate lever 56 in the clockwise direction as shown in FIGURE 2. This action lifts lever 54 by means of connecting pin 55 to raise latching lever 100 through the inter-action of notch 54' and pin 99. As a result the control gear 39 is rotated in a clockwise direction through the lifting action of latching lever 100 engaging pin 40.

As control gear 39 rotates, the control disk 21 as well as the entire multiplication unit 23 are rotated rearwardly a distance of two notches. This rear rotation carries lever 43 therewith to pivot arms 47 and 49 and to return link 124 to its original position. In addition lever 43 is guided back to its initial position and latching lever 100 returns to its normal resting position. The adjusting lever 120 engages pins 40 and 41 to bring the control gear 39 back into its rest position. Simultaneously therewith, the differential members 7 are totalled in the conventional manner and the values therein are transmitted positively through the inter-engagement of rack 36 and clearing gear 25. Stabilizing bar 14 is once again returned to its initial position and retained therein by locking lever 28.

When the multiplicand key is actuated, a continuous operation of the machine mechanism is commenced but the printing unit is stopped after the first revolution of the drive mechanism in the known manner. During the second revolution of the drive mechanism the differential members 7 again contact the numerical values established in the set pin carriage 84 and link 124, under the action of spring 125 moves to the right and pivots inter-connected arms 47 and 49 counter clockwise to cause flange 44 of lever 43 to fall into the recess 144 of control disk 21. In this manner link 124 again places both the multiplication unit and mechanism in operation and the values are again transmitted positively into both units.

As the same time latching lever 100 rotates multiplication unit 23 rearwardly two notches under the action of pin 40 of control gear 39 and the jack lever 43. In this way, the multiplication unit actually moves rearwardly four notches back to return to its initial position.

When multiplication unit 23 is engaged by stabilizing bar 14 as described above, pin 87 of the cam plate 18 is released from nose 137 of shift lever 85 so that lever 85 under the action of spring 86 engages the fixed stop pin 138. At the same time, lifting bar 75 is moved downwardly by the upward movement of lever 54 so that notch 76 becomes disengaged from lug 77 on the lever 78. The movement of shift lever 85 against pin 138 rotates lifting bar 75 toward the left under the action of link 90. During the rearward movement of control gear 39 of multiplication unit 23 and its return to the initial position on the second revolution of the drive mechanism, shift lever 85 is returned under the action of pin 87 while lifting bar 75 is again engaged with hinge lever 78. The clockwise rotation of lever 78 shifts the set pin carriage 84 to the left into the next highest decimal position. During a revolution of the drive mechanism in this decimal position control plate 15 shifts stabilizing bar 14 to the right to again achieve a coupling with multiplication unit 23. Locking lever 28 is released and gears 2 are rotated into the zero position. Since in this second decimal position the multiplication gears 2 are positioned to the decimal value zero of multiplier 704, zero stop 8 is positioned directly in front of flange 135 and accordingly there will be no rotation of the gears. As described previously link 124 rotates arms 49 and 47 until flange 44 of jack lever 43 is positioned in notch 141 of control disk 21. Thus, link 124 blocks the positioning of unit 23. At the same time, link 51 disengages lever 54 from pin 99. Accordingly, lifting of lever 54 will not affect latching lever 100. Lever 59 is rotated in the clockwise direction by means of lifting rod 75 when it is lifted and lever 78 also rotates under the action of known operations of such calculating machines.

During the next revolution of the drive mechanism in the third decimal place, the stabilizing bar 14 is again shifted to the right by control plate 15 accordingly, multiplication unit 23 is engaged by the end of bar 14, locking lever 28 is released and the gears 2 are rotated to either the zero or to the tens position. Cam 142 of control disk 21 will now be opposite flange 44 of jack lever 43, this structure being set forth in FIGURE 6. Since flange 44 is on top of cam 142 the link 124 will control the setting of only one calculating unit. The multiplication unit 23 is then rotated through a distance of seven notches so that roll 110 is positioned opposite the cam surface 139 of cam plate 18. Roll 110 is urged against the cam surface by the action of spring 123 on link 122 which is connected to control arm 105. The lever 102 is also rotated in a clockwise direction under the action of pin 108 and thus moves latching lever 100 a sufficient distance to the right so as to engage pin 41 of control gear 39. During the movement of link 122 toward the right, the calculating units of the machine are switched to minus.

During subsequent operation of the mechanism, latching lever 100 resets control gear 39 into the counter clockwise direction while flange 44 of jack lever 43 engages notch 143 in control disk 21 and advances unit 23 onto value 8. During this revolution of the machine drive mechanism the negative value is transmitted in one calculating unit only. During the next revolution of the drive mechanism, flange 44 can fall into recess 145. The jack lever 43 will now move multiplication unit 23 two notches closer to the value 10. During this operation the movement of control arm 105 to the right carries the lever 112 a sufficient distance to the right as viewed in FIGURE 4 that under action of spring 114 flange 113 will fall into recess 116 of slide lever 66. During the switching of multiplication unit 23 from value 8 to value 10, the cam surface 139′ of cam plate 18 is returned to its initial position under the action of cam roll 110. Also flange 113 together with slide lever 66 shift toward the left.

As a result, edge 64 of lever 61 is released from engagement with pin 65 and spring 62 brings the edge 64 back into contact with pin 72. When latching lever 100 is lifted to its maximum position lever 61 is sufficiently far down because of the clockwise rotation of lever 59 that its notch 61′ is now positioned under pin 72. Accordingly, after jack lever 43 has been rotated, latching lever 100 is returned again to its initial position. At this time lever 61 is lifted under the action of components 56, 58 and 59 and lever 71 is rotated by means of its pin 72 in the counter clockwise direction. Thus, cam surface 119 of lever 71 is rotated under the action of pin 87 and multiplication unit 23. In this manner, during the operation of the drive mechanism in the next decimal place, the multiplication unit 23 is reset to value 1 although it has not been rotated by the gears 2.

During the next revolution of the machine drive mechanism, flange 44 of jack lever 43 is positioned on cam 146 of control disk 41 and thus the link 124 responds to only one counting unit. In this position, roll 110 engages cam surface 148 of cam plate 18 and flange 44 of jack lever 43 passes over cam surface 146 to be positioned into notch 147 which is one notch to the rear on multiplication unit 23. Shift lever 85 is then returned to its initial position under the action of pin 87. Under the action of components 90, 75 and 78 there will be a further shifting of set pin carriage 84.

Thus it can be seen that the present invention discloses a multiplication arrangement for calculating machines which includes two separate calculating or counting units designated herein as the multiplication unit and multiplication mechanism. These two units are separate of each other but may be operatively coupled during the multiplication operation.

It will be understood that this invention is subject to modification in order to adapt it to different usages and conditions and, accordingly, it is desired to comprehend such modifications within this invention as may fall within the scope of the appended claims.

What is claimed is:
1. In an arrangement in calculating machines for multiplication wherein the multiplicands may be continuously added or subtracted and there is a corresponding successive series of machine revolutions for each decimal place of the multiplier, the combination of a housing having a key board thereon, a set pin carriage laterally movable within said housing upon depression of a key in said key board, a multiplication mechanism including a pair of spaced supporting arms pivotally mounted within said housing, a plurality of coaxially arranged multiplication gears mounted between said multiplication mechanism arms, a shaft extending between said arms and having an angle lever pivotally mounted thereon for operative engagement with said carriage, a plurality of differential members actuated by said set pins and operatively connected to said multiplication gears to transmit a value from said set pins to said gears, a stabilizing bar slidably mounted across said multiplication mechanism and lockingly engageable with said gears to lock said gears in position, and a multiplication unit mounted on a wall of said housing and lockingly engageable by said bar to couple said unit and mechanism in operative relationship.

2. In an arrangement as claimed in claim 1 and further comprising a drive mechanism within said housing for operating the calculating machine, and a plurality of linkage systems operatively connecting said machine drive mechanism with said multiplication mechanism and said multiplication unit.

3. In an arrangement as claimed in claim 1 with said multiplication gears having twenty gear teeth on one half of their circumferences with said teeth being operatively engageable with said differential members, there being two zero stops and a clearing cam on the other half of said gears.

4. In an arrangement as claimed in claim 1 with said angle lever also being axially movable and having a nose portion on one end engageable with said set pin carriage and a flange on the other end thereof, there also being an arcuate slot in said angle lever extending upwardly from the lower edge thereof.

5. In an arrangement as claimed in claim 1 and further comprising a fixed bushing extending within said housing from a wall thereof, said multiplication unit comprising a sleeve rotatably mounted on said bushing, a guiding cam plate mounted on said sleeve, a locking gear on said sleeve, a control disk on said sleeve and having a plurality of notches in the periphery thereof, a shaft within said housing extending from said bushing, and a control element pivotally mounted on said shaft.

6. In an arrangement as claimed in claim 1 with said slidable stabilizing bar having cam surfaces at both ends thereof so that axial movement of said bar will also move said bar laterally into and out of locking engagement with said gears.

7. In an arrangement as claimed in claim 5 with said cam plate having a plurality of radially extending slots therein with an end of said bar being insertable into said slots for coupling said cam plate to said multiplication mechanism, there being cam surfaces on the periphery of said cam plate, a U-shaped member having a cam follower roll on one arm thereof with said roll being engageable with said cam plate cam surfaces, a pair of diametrically opposed pins extending axially from said cam plate, and a lever resiliently urged into engagement with said cam plate pins.

References Cited
UNITED STATES PATENTS

| | | | |
|---|---|---|---|
| 2,216,063 | 9/1940 | Brand et al. | 235—60 |
| 2,403,480 | 7/1946 | Clary et al. | 235—60 |
| 2,905,382 | 9/1959 | Carnacina | 235—60 |
| 3,268,165 | 8/1966 | Gelling | 235—60 |
| 3,319,883 | 5/1967 | Thevis | 235—60 |

RICHARD B. WILKINSON, *Primary Examiner.*